Aug. 24, 1937.　　　A. T. COX　　　2,091,193

ROLLER DRILL

Filed March 11, 1935

Aaron Thomas Cox INVENTOR.

BY

ATTORNEYS.

Patented Aug. 24, 1937

2,091,193

UNITED STATES PATENT OFFICE 2,091,193

ROLLER DRILL

Aaron Thomas Cox, Wewoka, Okla.

Application March 11, 1935, Serial No. 10,564

1 Claim. (Cl. 255—71)

The invention relates to roller drills and more especially to a drilling bit constructed for use in earth drilling or boring, as for example, oil wells.

The primary object of the invention is the provision of a bit of this character, wherein the head thereof is made of complemental body halves and are united by welding for the assembly of cone shaped cutters, these being of novel construction to assure long life and excellent cutting action as well as being readily removable for replacement with new cutters or for repair of the used cutters.

Another object of the invention is the provision of a bit of this character, wherein the cone shaped cutters in the assemblage are susceptible of interchangeability and in which there is no need for lubrication as the mud in the boring of the earth gives lubrication and the binding of the cutters is eliminated there being a multicutting operation and assurance of a high cutting efficiency.

A further object of the invention is the provision of a bit of this character which is simple in construction, durable and strong, readily and easily assembled, allowing for interchanging of the cutters and inexpensive to manufacture.

With these and other objects in view, the invention consists in the features of construction, combination and arrangement of parts as will be hereinafter more fully described, illustrated in the accompanying drawing, which disclose the preferred embodiment of the invention and pointed out in the claim hereunto appended.

In the accompanying drawing.

Similar reference characters indicate corresponding parts throughout the several views in the drawing.

Figures 1, 3:
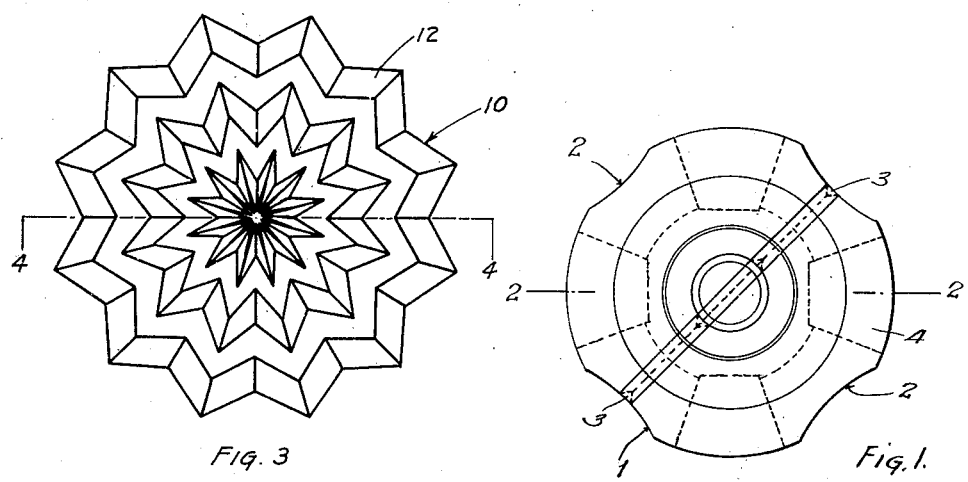
Figure 1 is a plan view of the head of the bit constructed in accordance with the invention.
Figure 3 is a plan view of one cone shaped cutter.
Figures 4, 5:
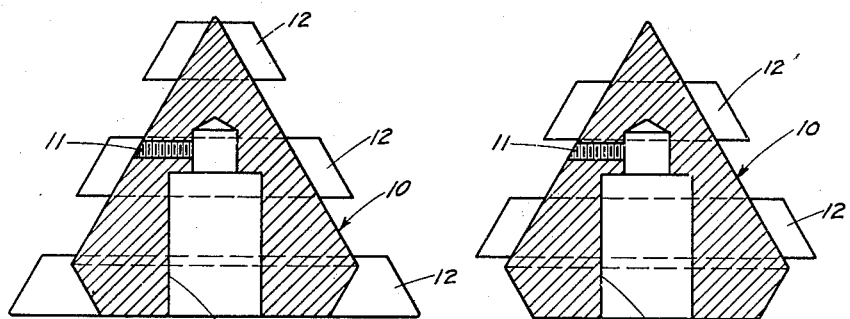
Figure 4 is a sectional view on the line 4—4 of Figure 3.
Figure 5 is a view similar to Figure 4 showing another cone shaped cutter of the group assembled with the head.
Figure 2:
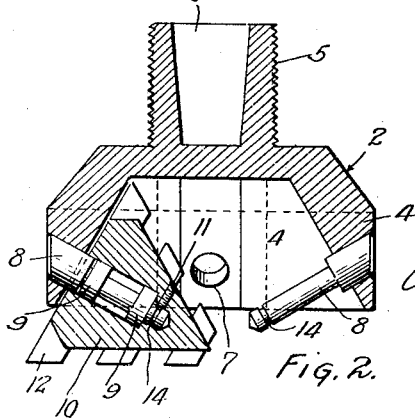
Figure 2 is a sectional view on the line 2—2 of Figure 1 showing one cone shaped cutter assembled with the head.

Referring to the drawing in detail, the bit constituting the present invention comprises a head designated generally at 1 of as light construction as may be consistent with the required strength. This head is formed of complemental body halves 2, these being joined with each other at the welded seam 3. The welding seam is provided by beveling the outer surface at the confronting halves of the head thus providing a V-shaped channel into which the welding material is introduced. The head interiorly thereof has preferably right angularly arranged flat projections 4 confronting the cavity provided therein as is conventional and opening through the bottom of the head. The inner flat faces of the projections 4 are thus angularly related.

Rising centrally from the head is an externally threaded neck 5 for the joining of the head with a drill shank, the neck being provided with a cored pocket 6.

The flat projections 4 are integral with the complemental body halves 2 and, as stated are disposed at an angle while formed in these pads are holes 7 drilled at right angles from the inner faces thereof, each for accommodating a shouldered or set-off pin 8, the same being preferably welded in the hole and the smaller portion of this pin carries annular bearing rollers 9 of the same exterior diameter as the diameter of the larger portion of the cutter pin adjacent the angular surface in the cavity opening through the bottom of the head for a cone shaped cutter 10 which is held upon the pin by a set screw 11, the cutter being formed with a stepped well or bore 13 presenting different diameters thereto, one diameter being of the same diameter as the diameter of the bearing rollers for accommodating the said bearing rollers 9 for the free rotation of the cutter upon the pin while the set screw engages a groove 14 provided in the smaller portion of the pin for rotatably holding the cutter thereon. These pins 8 are of course disposed at right angles to the angular faces of the projections 4.

Each body half 2 carries a pair of the cutters 10 and one of this pair has the spaced circular rows of serrated teeth 12, these being spaced about at equidistance from each other in the respective rows while the other cutter of the pair has the circular rows of serrated teeth 12'. The cutters are arranged side by side but slightly spaced from each other so that the teeth of one cutter will travel between the teeth of the adjacent cutter. In operation the head is advanced to the work and turned in the usual manner. Each cutter turns independently on its pin shaft 8 when the teeth thereof bite into the work. A well may be thus expeditiously drilled and the mud serves to lubricate the cutters while the constant revolving thereof prevents clogging. Of course, it is to be understood that the number of mating cone shaped cutters can be increased by muliples of two. The mounting of the cutters in the head is such that the latter projects from the cavity in the head 1 beyond the open bottom of said head to afford a high cutting efficiency and relieving choking of the cutters when drilling and prevents the rotative motion of the cone from being dissipated since there is no binding of the cutters in relation to the head. The rows of teeth 12 and 12' may be increased or decreased optionally.

The cutters in the groups of two constituting a pair are susceptible of being interchanged with respect to the cutters opposing them, the cutters being made from heat treated steel insuring long life and cutting action. The use of the complemental body halves assures interchangeability of the cutters and minimizes the manufacturing cost of making the bit.

What is claimed is:

In a roller drill comprising a substantially cup shaped head having an externally threaded socketed projection at the closed side thereof and also having its interior surface provided with equidistanced, spaced projections presenting angular surfaces, a cutter pin fixed in and extending at right angles from each of said projections and having two external portions each of a different diameter, exteriorly toothed cone shaped rollers having bores of different diameters with respect to each other and corresponding to the external diameters of said pins and opening through the wider ends of said rollers for receiving the pins therein, annular bearing rollers journaled on the pins and of the same exterior diameter as the diameter of the larger portions of the said pins and the larger bores in the said cone shaped members and accommodated within said larger bores, the said pins at their smaller external diameters being provided with annular grooves, and an adjustable element carried by each of the cone shaped rollers to be loosely received in the annular grooves of the respective pins for locking the said cone shaped rollers on the latter.

AARON THOMAS COX.